May 9, 1967 K. J. SCHRADER 3,318,328
ALARM SYSTEM
Filed May 26, 1965
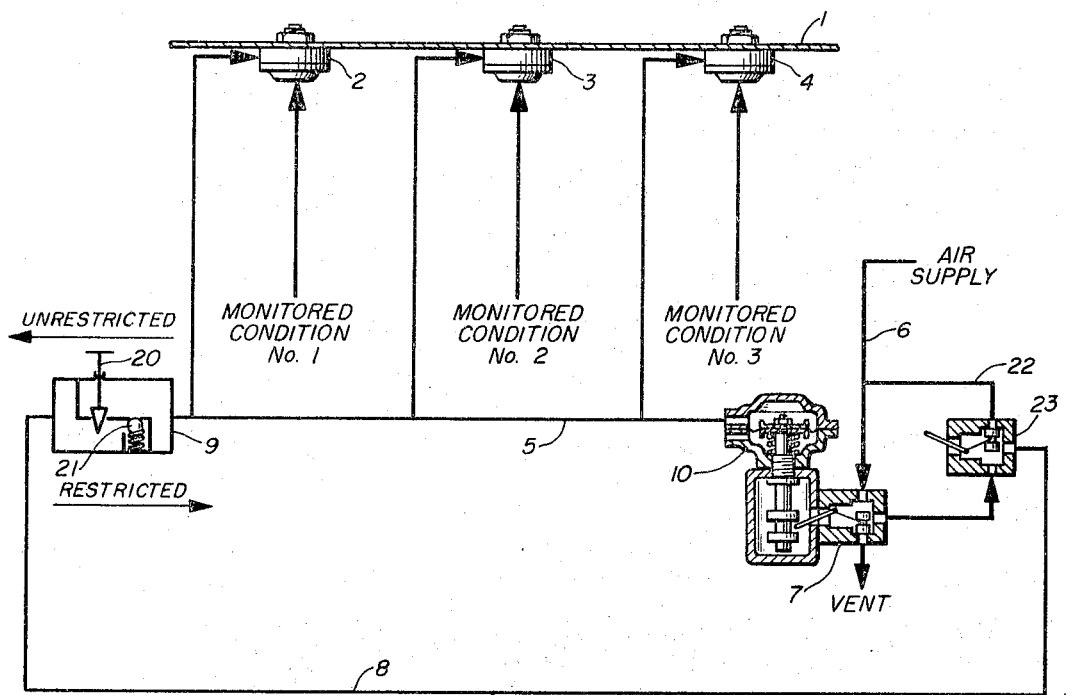
Fig. 1.
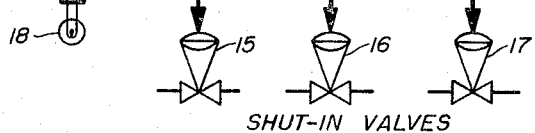
SHUT-IN VALVES
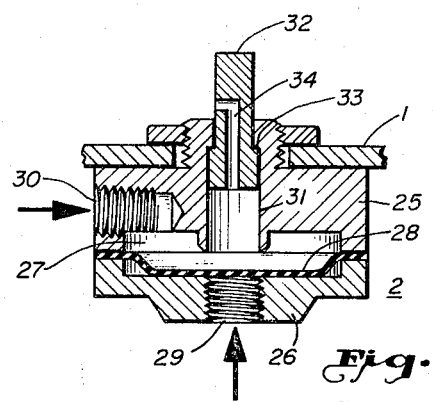
Fig. 2. Fig. 3.
INVENTOR
KENNETH J. SCHRADER
BY
ATTORNEY

United States Patent Office 3,318,328
Patented May 9, 1967

3,318,328
ALARM SYSTEM
Kenneth J. Schrader, Tulsa, Okla., assignor to Combustion Engineering, Inc., New York, N.Y., a corporation of Delaware
Filed May 26, 1965, Ser. No. 458,936
7 Claims. (Cl. 137—557)

The present invention relates to those systems developed to monitor a plurality of separate conditions by indicating a predetermined change in any one of the conditions. The invention also includes the feature of controlling factors by the system, the factors having established the conditions.

In the many industrial processes there are a number of operative conditions which it is desired to monitor. The conditions may go through a predetermined change or completely deteriorate. The changes, complete or partial, should be annunciated in order for supervisory personnel to be promptly informed. Remedial action by supervisory personnel may then proceed in a systematic manner. Also, it may be desired that a control action be automatically taken by the monitor system. It may be important that the first of a number of the monitored conditions be isolated so the supervisory personnel will have specific information to which it may react in correcting the condition change.

An object of the present invention is to annunciate which of the number of the monitored conditions underwent a predetermined change.

Another object is to positively isolate the annunciation of the first monitored condition which changed to resolve which of the conditions changed its predetermined amount.

The present invention contemplates a fluid-pressure manifold connected in parallel to a series of valves, each valve being capable of venting the manifold to a predetermined pressure level. Each valve is maintained in a closed position by a fluid pressure which is generated from the condition being monitored by that valve. When this fluid pressure generated by the monitored condition reduces to a predetermined level, the valve will be simultaneously actuated by the fluid pressure in annunciating the change while venting the manifold in order to positively prevent the remaining valves being actuated by changes in their respective conditions. Additionally, the manifold is arranged to actuate any additional annunciation and/or control mechanisms of the process required for correction or safety purposes.

Other objects, advantages and features of the present invention will become readily apparent from the following detailed description of the invention with specific reference to the accompanying drawings, in which:

FIG. 1 is a schematic representation of a complete alarm system in which the invention is embodied;

FIG. 2 is a sectioned elevation of one of the valves of FIG. 1 which responds to one of the monitored conditions; and FIG. 3 is the valve of FIG. 2 positioned to annunciate while venting the manifold to render the other valves inoperative.

GENERAL SYSTEM DESCRIPTION

In FIG. 1 a plan view of panel board 1 has been illustrated. Valves 2, 3 and 4 are mounted behind this panel board to extend their annunciating structure from the face of the board. Each valve is indicated as responsive to a condition to be monitored. When a particular one of the conditions changes a predetermined amount, the valve associated with the condition protrudes a piston from the face of the panel board where it can be readily viewed. The specific annunciation on the front of the board can take various forms. The piston can be linked to a number of devices to give visual manifestations.

The valves 2, 3 and 4 are connected in parallel to a manifold conduit 5. The arrangement of the manifold and valves is made so as to vent conduit 5 when any one of the valves annunciates its condition change. It is this venting which provides a positive isolation of the first valve to annunicate. In this sense, isolation specifically means that the remaining valves are deprived of this source of fluid power from conduit 5 which is required to annunciate. Therefore, the first condition to be annunciated locks the system positively to prevent subsequent annunciation of the other conditions which may subsequently change. Supervisory personnel will then know which of the conditions was the first to fail, and remedial action can then be taken systematically.

BASIC POWER SUPPLY

The fluid pressure supply for conduit 5 is normally generated by compressing air, or gas of some sort. This source of power is received by the system through conduit 6. From conduit 6, the supply pressure fluid is routed through three-way valve 7, conduit 8, restrictive device 9, and into manifold conduit 5. The pressure in conduit 5 is then maintained until vented through one of the valves 2, 3 or 4.

Manifold conduit 5 is also connected to diaphragm operator 10. Operator 10 positions valve 7 alternately to two positions. As shown in FIG. 1, the pressure of conduit 5 on the top of the diaphragm maintains the valve 7 in its first position to connect supply conduit 6 to conduit 8.

OPERATOR 10—THREE-WAY VALVE 7

Control valves 15, 16 and 17 are connected to conduit 8 for actuation when one of the monitored conditions shuts down the process. It would be possible to connect these shut-in valves directly to manifold 5 so they would be actuated when the manifold 5 is vented. However, in one practical sense, the flow from the air supply into manifold 5 must be restricted so manifold 5 can be quickly vented through any of the valves 2, 3 or 4. This delicate balance between the amount of power fluid restricted into manifold 5 and the amount vented through one of the valves 2, 3 and 4 is isolated from the problem of actuating shut-in valves 15, 16 and 17 by restrictive device 9 connected between conduit 8 and conduit 5. The venting of conduit 8 can then fall primarily on three-way valve 7 as actuated by operator 10.

Operator 10 is responsive to pressure in conduit 5 as was explained supra. When this conduit 5 pressure decreases to a predetermined value, valve 7 is thrown to its opposite position from the that shown in FIG. 1 and conduit 8 is vented, actuating shut-in valves 15, 16 and 17.

It is also possible to annunciate from the pressure in conduit 8. A light 18 is indicated as connected to conduit 8 for annunciation at some remote location, signaling that the shut-in valves have been taken to their shut-in positions by the venting of conduit 8.

RESTRICTIVE DEVICE 9

The basic control of the fluid pressure supply of conduit 6 into manifold conduit 5 is regulated by setting valve 20 in restrictive device 9. Spring-loaded check valve 21 will not permit passage of fluid from conduit 8 to conduit 5. All of the flow must be through the seat of valve 20, this being set manually.

When conduit 8 is vented through valve 7, spring-loaded check valve 21 will permit evacuation of manifold conduit 5 through restrictive device 9. This is an extra venting provision for conduit 5 at the time one of the valves 2, 3 or 4 is actuated.

START-UP PROVISION

After one of the monitored conditions has caused the manifold conduit 5 to be vented, the system must be eventually placed in the condition indicated in FIG. 1 for normal operation. After any required remedial measures have been taken, manifolds 8 and 5 may be repressured from conduit 6 through conduit 22 which by-passes valve 7. Manually operated valve 23 is placed in conduit 22 for this purpose. Once conduits 5 and 8 are pressured from the supply in conduit 6, operator 10 will be repositioned to that illustrated in FIG. 1 and the process will function normally until there is another predetermined change in one of the monitored conditions.

MONITOR VALVES

FIG. 2 shows valve 2 as illustrative of the valves 2, 3 and 4. To embody the invention, the valve is formed of two simple body structures 25 and 26 which are clamped together to form diaphragm cavity 27.

Clamped between body housing structures 25 and 26 is a diaphragm 28 which isolates port 29 from port 30 while effectively covering one end of cylinder 31 formed in body housing portion 25.

In FIG. 2 diaphragm member 28 is shown as pressed against the internal opening of cylinder 31 so as to seal cylinder 31 against entry of fluid pressure from port 30 which is connected to manifold conduit 5. With diaphragm 28 positioned as in FIG. 2, piston 32 can be pushed back against diaphragm 28 and will remain in that position. The outer end of piston 32 is then substantially flush with the end of housing portion 25 which is extended through panel 1.

When the pressure from the monitored condition, introduced into port 29, reduces to a predetermined magnitude, diaphragm 28 is pushed back against port 29 in housing 26 as shown in FIG. 3. A pressure from manifold conduit 15 through port 30 then acts upon the inner end of piston 32 and pushes piston 32 up against shoulder 33. The outer end of piston 32 is then exposed in the annunciating position and passage 34 in piston 32 vents the fluid pressure from manifold conduit 5. Therefore, valve 2 simultaneously annunciates the change in the condition that is monitored while venting manifold 5 to positively prevent subsequent change in the remaining conditions from being annunciated on the panel board.

From the foregoing it will be seen that this invention is one well adapted to attain all of the ends and objects hereinabove set forth, together with other advantages which are obvious and which are inherent to the apparatus.

Iit will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. An alarm system including,
   a fluid pressure manifold conduit,
   a supply of fluid pressure connected to the manifold to normally maintain the manifold pressurized and in an inoperative condition,
   a plurality of monitor valves connected in parallel to the manifold, each valve having a first position in which the valve retains the pressure of the supply within the manifold and a second position in which the valve simultaneously vents the manifold pressure to atmosphere and annunciates the second position,
   and a conduit connected to each valve and receiving a fluid pressure generated by a separate normal monitored condition of a process which fluid pressure will hold the valve in its first position, the valve being moved to its second position when the monitored condition changes a predetermined amount from normal.

2. The system of claim 1 including,
   a control valve regulating at least one of the monitored conditions connected to the manifold so as to be actuated when any monitor valve is moved to its second position.

3. The system of claim 1 in which,
   each monitor valve is connected to the manifold and arranged so as to annunciate its second position only if it is the first of the monitor valves to reach its second position.

4. The system of claim 3 in which,
   a restrictive device is connected between the supply and the manifold, the restriction being sized to enable any one monitor valve to effectively vent the manifold in its second position within a predetermined period of time.

5. The system of claim 3 in which,
   a two-position valve is connected between the restriction device and the supply to alternately and selectively vent the manifold and connect the manifold to supply,
   and means connected to place the valve in its alternate positions in response to the pressure in the manifold.

6. The system of claim 5 including,
   a by-pass conduit around the two-position valve of claim 5,
   and a manually controlled two-position valve in the by-pass with which the manifold can be initially pressured from the supply and place the valve of claim 5 in position to connect the manifold to supply.

7. A valve for use in the system of claim 1, including,
   a casing having two parts forming a cavity when the two parts are joined,
   a diaphragm dividing the cavity into two sections,
   a cylinder in a first of the casing parts extending into the cavity to form a seat for closure by the diaphragm,
   an opening into the second of the casing parts to receive the fluid pressure generated by a separate normal monitored condition of a process and move the diaphragm into sealing engagement with the cylinder seat,
   an opening into the first of the casing parts to receive the pressure of the supply,
   and a piston in the cylinder which is movable into an annunciating position by the supply pressure when the condition pressure decreases to a value below the supply pressure and the supply pressure moves the diaphragm away from the cylinder seat.

References Cited by the Examiner
UNITED STATES PATENTS

| | | | |
|---|---|---|---|
| 2,635,631 | 4/1953 | Seefluth et al. | 251—61 X |
| 3,140,726 | 7/1964 | Arenhold | 137—510 X |
| 3,228,300 | 1/1966 | Potts et al. | 137—557 X |

M. CARY NELSON, *Primary Examiner.*